US012083751B2

(12) United States Patent
Mee

(10) Patent No.: US 12,083,751 B2
(45) Date of Patent: Sep. 10, 2024

(54) METHOD AND TOOL SET FOR MANUFACTURING A COMPOSITE COMPONENT

(71) Applicant: Rolls-Royce plc, London (GB)

(72) Inventor: Kevin Mee, London (GB)

(73) Assignee: ROLLS-ROYCE PLC, London (GB)

( * ) Notice: Subject to any disclaimer, the term of this patent is extended or adjusted under 35 U.S.C. 154(b) by 500 days.

(21) Appl. No.: 17/257,634

(22) PCT Filed: Jul. 3, 2019

(86) PCT No.: PCT/EP2019/067856
§ 371 (c)(1),
(2) Date: Jan. 4, 2021

(87) PCT Pub. No.: WO2020/007916
PCT Pub. Date: Jan. 9, 2020

(65) Prior Publication Data
US 2021/0299974 A1    Sep. 30, 2021

(30) Foreign Application Priority Data
Jul. 4, 2018 (GB) ..................... 1811019

(51) Int. Cl.
*B29C 70/34* (2006.01)
*B29C 37/00* (2006.01)
(Continued)

(52) U.S. Cl.
CPC .......... *B29C 70/345* (2013.01); *B29C 37/005* (2013.01); *B29C 43/14* (2013.01);
(Continued)

(58) Field of Classification Search
CPC ........ B29C 70/28–56; B29C 2791/001; B29C 2043/144; B29C 2043/148; B29C 43/14; B29C 37/005
See application file for complete search history.

(56) References Cited

U.S. PATENT DOCUMENTS 4,378,265 A  *  3/1983  Kiss .................... B27N 5/00
                                                   264/119
5,292,475 A      3/1994  Mead et al.
(Continued)

FOREIGN PATENT DOCUMENTS

EP    1384539 A1    1/2004
EP    3369559 A1    9/2018
(Continued)

OTHER PUBLICATIONS

Apr. 26, 2023—(JP) Official Action—App 2020-570807.
(Continued)

*Primary Examiner* — John J DeRusso
(74) *Attorney, Agent, or Firm* — Banner & Witcoff, Ltd.

(57) ABSTRACT

There is disclosed a method of manufacturing a composite component. A preform for the component is laid-up on a lay-up tool so that a first surface of the preform conforms to a lay-up profile of the tool. The preform is transferred to a forming tool comprising opposing first and second forming surfaces, each having a near net shape profile corresponding to a respective side of the component. The preform is formed in the forming tool to a near net shape of the component. The preform has a preform bulk in excess of the near net shape of the component prior to forming, and the lay-up profile is offset relative to the near net shape profile of the first forming surface to accommodate a proportion of the preform bulk. Accordingly, both the first surface and an opposing second surface of the preform displace during forming to (Continued)

conform to the respective near net shape profiles of the forming surfaces.

12 Claims, 5 Drawing Sheets

(51) Int. Cl.
| | |
|---|---|
| *B29C 43/14* | (2006.01) |
| *B29C 70/44* | (2006.01) |
| *B29C 70/46* | (2006.01) |
| *B29C 70/54* | (2006.01) |
| *B29D 99/00* | (2010.01) |
| *F01D 5/28* | (2006.01) |

(52) U.S. Cl.
CPC .......... *B29C 70/446* (2013.01); *B29C 70/462* (2013.01); *B29C 70/543* (2013.01); *B29C 70/545* (2013.01); *B29D 99/0025* (2013.01); *F01D 5/282* (2013.01); *B29C 2043/144* (2013.01); *B29C 2791/001* (2013.01); *F05D 2220/32* (2013.01); *F05D 2230/20* (2013.01); *F05D 2300/603* (2013.01)

(56) References Cited

U.S. PATENT DOCUMENTS

| | | |
|---|---|---|
| 5,939,006 A | 8/1999 | Wang et al. |
| 2019/0111636 A1* | 4/2019 | Van Nieuwenhove ...................... B29C 70/38 |

FOREIGN PATENT DOCUMENTS

| | | | |
|---|---|---|---|
| FR | 2950286 A1 | | 3/2011 |
| GB | 611708 A | * | 11/1948 |
| GB | 2556043 A | | 5/2018 |
| JP | H06155642 A | | 6/1994 |
| JP | 2014-534914 A | | 12/2014 |
| WO | 2017/004458 A2 | | 1/2017 |

OTHER PUBLICATIONS

Jul. 4, 2022—(CN) Office Action—App 2019800451083.
Jan. 4, 2019—(GB) Search Report—App. No. GB1811019.7.
Sep. 26, 2019—(WO) International Search Report & Written Opinion—App. No. PCT/EP2019/067856.

* cited by examiner

METHOD AND TOOL SET FOR MANUFACTURING A COMPOSITE COMPONENT

CROSS-REFERENCE TO RELATED APPLICATIONS

This application is a U.S. National Stage application under 35 U.S.C. § 371 of International Application No. PCT/EP2019/067856, filed Jul. 3, 2019, which claims the benefit of priority to United Kingdom Application No. GB 1811019.7, filed Jul. 4, 2018, and the present application claims the benefit of the filing date of both of these prior applications, which are incorporated by reference in their entireties.

TECHNICAL FIELD

The present disclosure relates to a method and tool set for manufacturing a composite component.

BACKGROUND

Composite materials, such as carbon fibre reinforced polymers (CFRP), are increasingly selected for use in components as they may provide desirable combinations of material properties, such as high strength and low weight. In particular, it has been proposed to manufacture components for use in the aerospace industry from composite materials.

Composite materials are traditionally manufactured by way of a lay-up procedure in which successive plies of fibre reinforcement material are applied on a lay-up tool (or mold) to build up a preform corresponding to the desired shape of the component. Fibre reinforcement material may be pre-infused with matrix material such as a resin (known as "pre-preg", or pre-impregnated fibre reinforcement material), or it may otherwise be provided with a matrix material after lay-up (known as "resin transfer").

It is generally necessary to lay-up a preform to occupy a larger volume than the net shape of the component, since the preform will incorporate a preform bulk (i.e. a volume in excess of its consolidated and cured shape) that is removed under pressure during forming and/or curing. For example, preform bulk may be in the order of 10% of the net shape of the component (i.e. of the final shape of the component).

Preform bulk accumulates along the stacking direction of a preform from a first surface received on the lay-up tool to an opposing second surface. Preform bulk is typically removed under pressure by applying a vacuum bag or caul plate over the second surface. The plies towards the second surface tend to be displaced farthest during de-bulking. Displacement during de-bulking may cause forming defects, such as wrinkling.

BRIEF SUMMARY

According to an aspect there is provided a method of manufacturing a composite component, comprising: laying-up a preform for the composite component on a lay-up tool so that a first surface of the preform conforms to a lay-up profile of the lay-up tool; transferring the preform to a forming tool comprising opposing first and second forming surfaces, each having a near net shape profile corresponding to a respective side of the component; and forming the preform in the forming tool to a near net shape of the component; wherein the preform has a preform bulk in excess of the near net shape of the component prior to forming; and wherein the lay-up profile of the lay-up tool is offset relative to the near net shape profile of the first forming surface of the forming tool to accommodate a proportion of the preform bulk; whereby both the first surface and an opposing second surface of the preform displace during forming to conform to the respective near net shape profiles of the forming surfaces of the forming tool.

In other words, the lay-up profile may be offset relative to the near net shape profile of the first forming surface so as to permit preform bulk to exceed a near net shape for the component on opposing sides of the preform.

The term "near net shape" is a term of the art which is used herein to indicate a shape which is close to that of the final shape (i.e. the net shape) of a component, such that minimal finishing (e.g. machining) is required after forming to near net shape in order to finish the component.

The lay-up profile of the lay-up tool may be offset relative to the near net shape profile of the first forming surface of the forming tool to accommodate approximately half of the preform bulk.

The lay-up profile of the lay-up tool may be offset from the near net shape profile of the first forming surface of the forming tool so that forming the preform in the forming tool causes: the first surface of the preform to displace by a first surface displacement distribution to adopt the near net shape profile of the second forming surface of the forming tool; and the second surface of the preform to displace by a second surface displacement distribution to adopt the near net shape profile of the second forming surface of the forming tool. The first and second surface displacement distributions may be equal and opposite one another.

The near net shape of the component may have a variable thickness distribution between the respective sides of the component. The lay-up profile of the lay-up tool may be offset relative to the near net shape profile of the first forming surface of the forming tool in proportion to the variable thickness.

In other words, there may be an offset distribution between the lay-up profile of the lay-up tool and the near net shape profile of the first forming surface of the forming tool, and the offset distribution may be proportional to the thickness distribution of the component.

The lay-up profile of the lay-up tool may be offset relative to the near net shape profile of the first forming surface of the forming tool over at least a sub-region of the lay-up tool. A further sub-region of the lay-up profile may not be offset from a respective region of the first forming surface, for example, it may have the same profile. For example, a root sub-region of the lay-up profile corresponding to a root of the fan blade body may be offset from the near net shape profile of the first forming surface, whereas an aerofoil core sub-region of the lay-up profile corresponding to an aerofoil core of the fan blade body may have the same profile as a corresponding sub-region of the first forming surface.

The component may be a blade body for an aerofoil structure, such as a fan blade for a gas turbine engine. The lay-up profile may correspond to at least a blade root of the blade body.

A blade root portion of the preform may have a plane of symmetry between the first and second surfaces of the preform, prior to forming in the forming tool. Accordingly, first and second surface displacement distributions during forming may be symmetrical, to provide a blade root with a symmetrical near net shape.

According to a second aspect there is provided a tool set for forming a composite component, comprising: a lay-up tool having a lay-up profile and configured to impart the lay-up profile on a first surface of a preform for the component; and a forming tool configured to form the preform to a near net shape of the component, the forming tool comprising opposing first and second forming surfaces, each having a near net shape profile corresponding to a respective side of the component; wherein the lay-up profile of the lay-up tool is offset relative to the near net shape profile of the first forming surface of the forming tool to accommodate a proportion of a preform bulk of the preform in excess of the near net shape of the component; such that in use the first surface of a preform laid up on the lay-up tool is displaced during forming to conform to the near net shape profile of the first forming surface of the forming tool.

The lay-up profile of the lay-up tool may be offset relative to the near net shape profile of the respective forming surface of the forming tool to accommodate a proportion of a preform bulk, the preform bulk corresponding to between 4% and 12% of a local thickness of the near net shape defined by the forming tool.

The lay-up profile of the lay-up tool may be offset relative to the near net shape profile of the first forming surface of the forming tool to accommodate approximately half of a preform bulk corresponding to between 4% and 12% of a local thickness of the near net shape (as defined by the forming tool)—i.e. between 2% and 6% of a local thickness of the near net shape.

The near net shape of the component may have a variable thickness distribution. The lay-up profile of the lay-up tool may have a variable offset distribution which is in proportion to the variable thickness distribution of the near net shape of the component.

The tool set may be for manufacturing a fan blade body including a blade root, wherein the lay-up profile of the lay-up tool corresponds to at least the blade root.

According to a third aspect there is provided a composite blade body (such as a fan blade body or blade body for another blade for a gas turbine engine) manufactured by a method in accordance with the first aspect.

According to a fourth aspect there is provided a gas turbine engine comprising one or more blades comprising a composite blade body in accordance with the third aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

The invention will now be described, by way of example, with reference to the accompanying drawings, in which.

DETAILED DESCRIPTION

Figure 1:
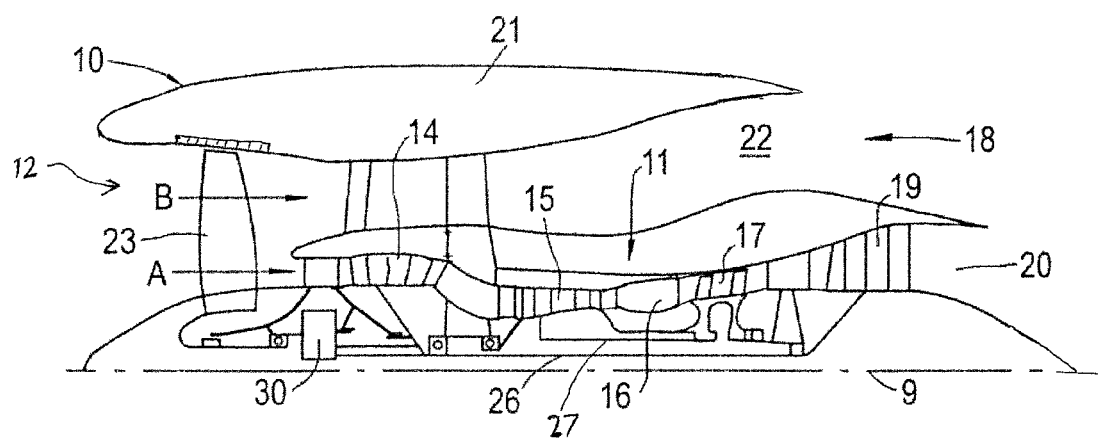
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
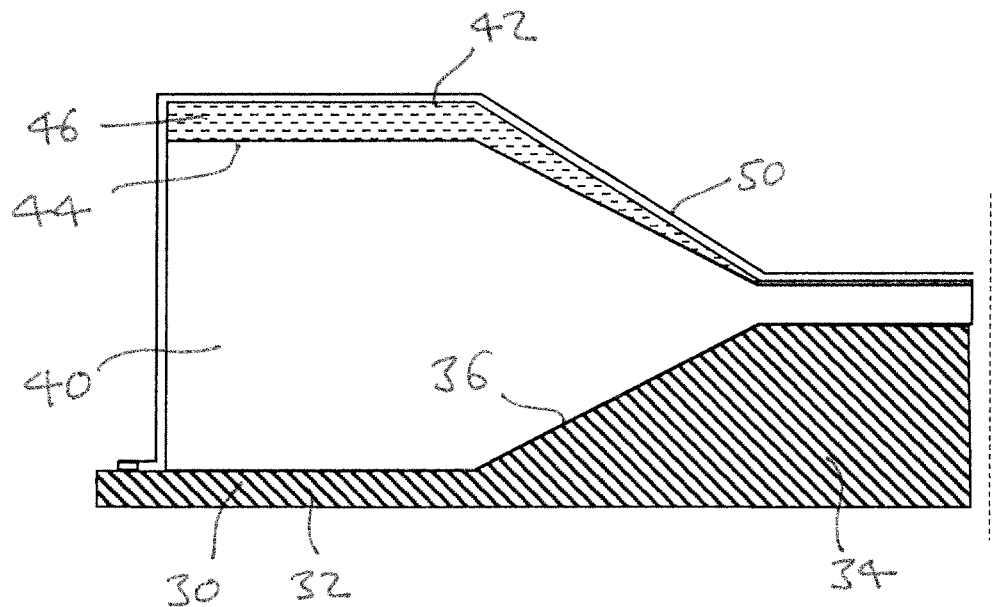
FIGS. 2 and 3 schematically shows lay-up and de-bulking of a preform for a fan blade body on a tool according to the prior art.

FIG. 2 shows a partial cross-sectional view of a previously-considered example lay-up tool 30 for a preform 40 corresponding to a fan blade for a gas turbine. The tool 30 is for a composite fan blade body comprising a radially-inner root for insertion into a hub, and a radially-outer aerofoil core for rotation in the annulus of the turbine to accelerate air. A composite fan blade body may be provided with additional components to complete manufacture of a fan blade, such as protective leading edge and tip metalwork which may be bonded to the aerofoil core. References herein to a radial direction refer to a direction along which the fan blade is designed to extend when installed in a fan. It may be equivalent to a spanwise direction of the fan blade. In this example the cross-sectional view is parallel with the radial direction and normal to a chord-wise direction of the fan blade (i.e. of the preform for the fan blade).

The view in FIG. 2 is partial as it shows a root portion 32 of the tool corresponding to a root of the fan blade, and only a minor part of an aerofoil portion 34 of the tool, corresponding to a proximal (i.e. closest to the root) part of the aerofoil core. The dashed line adjacent the truncated aerofoil portion of the tool (and preform, vacuum bag) indicates that the respective elements of the drawing continue beyond the partial view.

The lay-up tool 30 defines a lay-up surface 36 having a lay-up profile corresponding to a near net shape of a first side of the fan blade. The root of the fan blade is to have a thick root (i.e. along a thickness direction normal to the radial direction and a chordwise direction of the blade at the root) for engaging the hub of the fan and reacting centrifugal forces on the fan blade at the hub. In this simplified example, the root has a proximal portion of constant thickness, and a tapering neck portion which tapers towards the aerofoil core of the fan blade. In this example the root is symmetrical with respect to the radial direction.

FIG. 2 shows a preform 40 that has been applied onto the lay-up tool by successive application of plies of fibre-reinforcement material (e.g. pre-preg carbon fibre reinforced polymer) in a layer-wise manner. A lowest ply of the preform 40 therefore conforms to the profile of the lay-up surface 36 of the lay-up tool, which itself corresponds to the near net shape of the first side of the fan blade.

An uppermost ply 42 of the preform 40 does not conform to a near net shape of an opposing second side of the fan blade. Instead, the preform 40 is applied to incorporate a preform bulk which in this example corresponds to 10% of the thickness of the net shape profile of the fan blade (though in other examples it may be another amount, such as between 4-12% of the thickness of the net shape profile). This is illustrated in FIG. 2 by a virtual line 44 which corresponds to the near net shape profile of the second side of the fan blade, and a preform bulk portion 46 of the preform which exceeds the near net shape of the fan blade by 10%. In this example, the virtual line 44 is a mirror image of the lay-up surface 36 at the root, as the root of the fan blade is to be symmetrical about the radial plane.

FIG. 2 shows a vacuum bag 50 applied over the preform and sealed with the tool 30 (not shown at the distal end of the tool) in readiness for forming.

Figure 3:
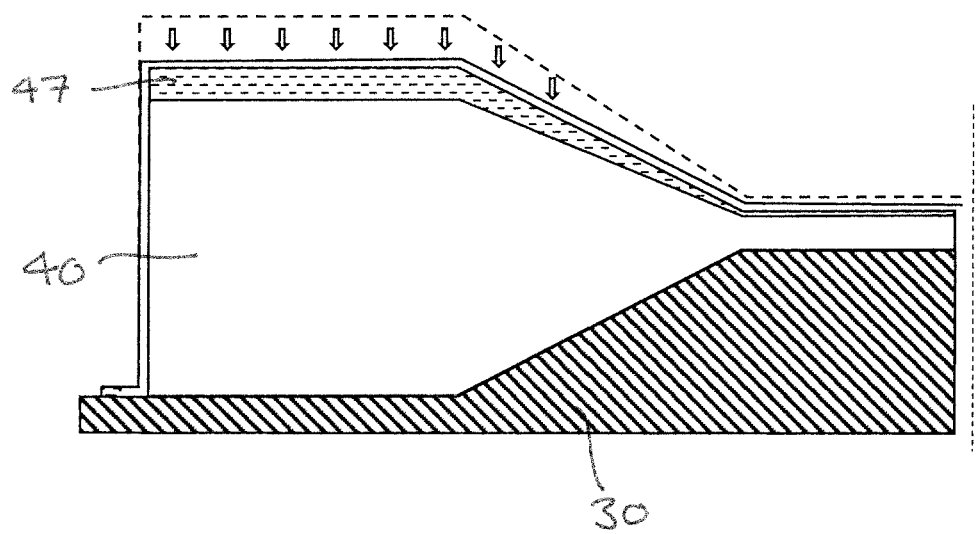

FIG. 3 shows the preform 40 on the tool 30 following forming of the preform under elevated temperature and pressure to consolidate the preform 40. The preform bulk in the preform 40 is removed during forming such that the uppermost ply 42 of the preform displaces to correspond to the near net shape profile of the second side of the fan blade. The displacement is illustrated in FIG. 3 by arrows showing movement of the vacuum bag 50. A region of the preform 47 corresponding to the preform bulk portion 46 of the preform prior to forming is shown in shaded view, to illustrate that the plies corresponding to the preform bulk portion 46 have been displaced, rather than removed.

Accordingly, the highest displacement during forming is typically the displacement of the uppermost ply 42 and the neighbouring plies, with no or low displacement of the lower most ply adjacent the lay-up surface.

Figure 4:
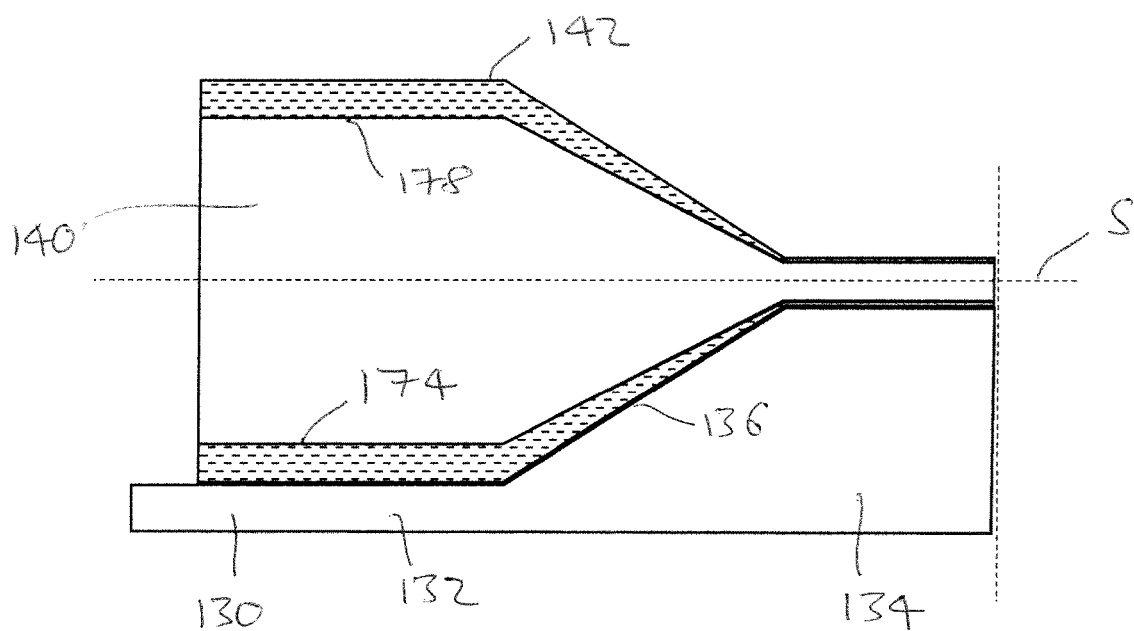
FIG. 4 schematically shows lay-up of a preform for a fan blade body on a lay-up tool.

FIG. 4 shows an example lay-up tool 130 according to the invention which differs from the lay-up tool 30 of FIGS. 2 and 3 in that a lay-up profile 136 defined by a lay-up surface of the lay-up tool 130 is offset relative to the near net shape profile of a corresponding side of a fan blade to accommodate a proportion of a preform bulk. Accordingly, in a preform 140 formed on the tool, the preform bulk is distributed over both first and second sides of the preform, such that for the same net total of preform bulk (e.g. 10% of net shape thickness) the largest displacement of plies in the preform is reduced, as compared with the preform 40 of FIGS. 2 and 3.

In this example, the lay-up tool 130 is provided in a tool set including a forming tool having a first forming surface which defines the near net shape profile of a respective first side of the fan blade, as will be described in further detail below. Accordingly, the offset of the lay-up profile 136 can be assessed with respect to the near net shape profile of the first forming surface of the forming tool.

FIG. 4 shows a partial cross-sectional view of the example lay-up tool 130 for laying up the preform 140 corresponding to a fan blade body for a fan blade of a gas turbine. The tool 130 is for a fan blade body comprising a radially-inner root for insertion into a hub, and a radially-outer aerofoil core for rotation in the annulus of the turbine to accelerate air. In this example the cross-sectional view is parallel with the radial direction and normal to a chord-wise direction of the fan blade (i.e. of the preform for the fan blade), as in FIGS. 2 and 3.

The view in FIG. 4 is partial as it shows a root portion 132 of the tool corresponding to a root of the fan blade body, and only a minor part of an aerofoil portion 134 of the tool, corresponding to a proximal (i.e. closest to the root) part of the aerofoil core. The dashed line adjacent the truncated aerofoil portion of the tool (and preform, vacuum bag) indicates that the respective elements of the drawing continue beyond the partial view.

The root of the fan blade body is to have a thick root (i.e. along a thickness direction normal to the radial direction and a chordwise direction of the blade at the root) for engaging the hub of the fan and reacting centrifugal forces on the fan blade body at the hub. In this simplified example, the root has a proximal portion of constant thickness, and a tapering neck portion which tapers towards the aerofoil core of the fan blade body. In this example the root is symmetrical with respect to the radial direction.

FIG. 4 shows the lay-up tool 130 with the preform 140 as applied onto the tool, but prior to forming so that it incorporates a preform bulk. The preform 140 is applied onto the lay-up tool by successive application of plies of fibre-reinforcement material (e.g. pre-preg carbon fibre reinforced polymer) in a layer-wise manner. A lowest ply of the preform 140 therefore conforms to the lay-up profile 136 of the lay-up surface of the lay-up tool 130.

In this example, the preform bulk corresponds to 10% of the thickness of the near net shape of the fan blade body. The near net shape of the fan blade body is defined by the forming tool as will be described in further detail below. However, for illustrative purposes the near net shape of the fan blade body is shown within the preform 140 by a first side profile 174 corresponding to the near net shape profile of a first forming surface of the forming tool (which defines the near net shape of the first side of the fan blade body) and by a second side profile 178 corresponding to the near net shape profile of a second forming surface of the forming tool (which defines the near net shape of the second side of the fan blade body). Outer portions 175, 179 of the preform between the lowermost ply and the first side profile 174; and between the uppermost ply and the second side profile 178 correspond to the preform bulk of the preform 140.

As shown in FIG. 4, the lay-up profile 136 is offset relative to the first side profile 174 representing the near net shape profile of the first forming surface of the forming tool, so as to accommodate a proportion of the preform bulk. In this simplified example, the offset is apparent from the taper of a neck portion of the lay-up profile as compared with the corresponding taper of the first side profile 174 (i.e. the first forming surface 164). In particular, the taper is steeper in the lay-up profile 136 than the taper in the first side profile 174 (i.e. the first forming surface 164). In other examples, the offset may be apparent from differences in other corresponding features. For example, a local curvature may be lower in the lay-up profile of the lay-up tool than in the first forming surface of the forming tool, and the extent of the of lay-up profile along the thickness direction between a maximum and a minimum will be greater than the corresponding extent of the first forming surface.

In this example, the lay-up profile 136 of the lay-up tool 130 is offset to accommodate half of the preform bulk. Accordingly, in this example, a profile of an uppermost ply 142 of the preform 140 mirrors the profile of the lowermost ply of the preform (which conforms to the lay-up profile 136 of the lay-up tool 130) in the root, and the first and second surfaces of the preform defined by the lowermost ply and the uppermost ply respectively are symmetrical about a plane of symmetry S prior to forming (which in this example corresponds to the radial plane).

Figure 5:
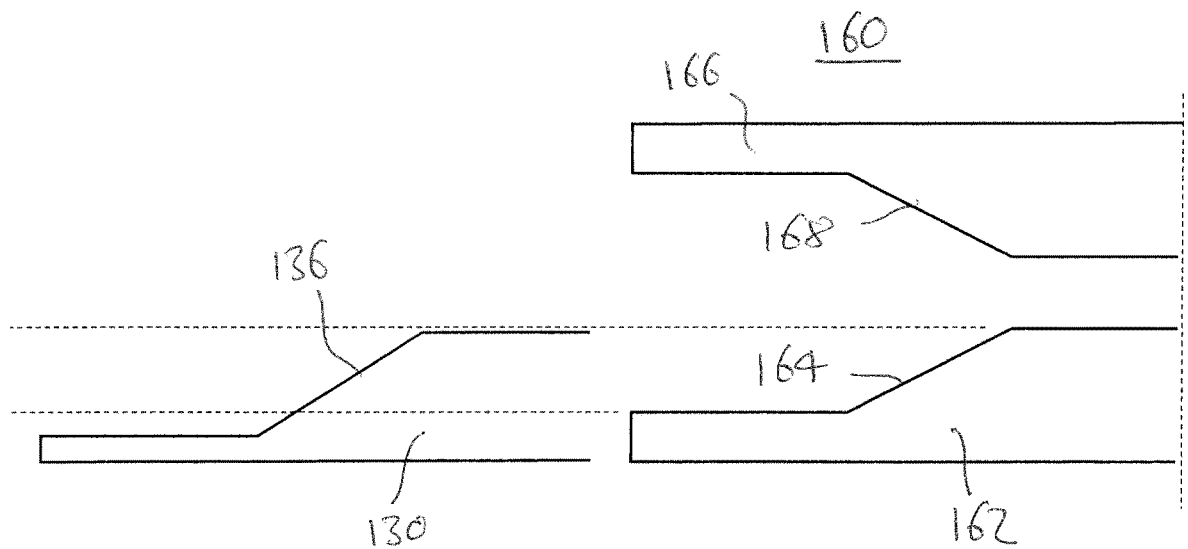
FIG. 5 schematically shows a tool set including the lay-up tool of FIG. 4 and a forming tool.

In this example, the preform 140 is transferred to the forming tool 160 for forming. FIG. 5 shows the tool set including the lay-up tool 130 and the forming tool 160, which comprises a first forming element 162 having the first forming surface 164 as described above, and an opposing second forming element 166 having the second forming surface 168 as described above.

As the fan blade body is to be symmetrical in the root, the first and second forming surfaces 164, 168 are mirror images of one another, though in other examples the fan blade body may not be symmetrical in the root, and the forming surfaces may not mirror one another accordingly. The construction lines in FIG. 5 illustrate the offset of the lay-up profile 136 of the lay-up tool with respect to the first forming surface 164 of the first forming element 162. In particular, it can be seen that the offset between the lay-up surface of the lay-up tool and the first forming surface of the forming tool scales with local thickness of the root, such that the offset is greater for relatively thicker portions of the root and less for relatively thinner portions of the root. This reflects that the amount of preform bulk to be accommodated is generally proportional to the local thickness. In other words, there is a variable offset distribution between the lay-up profile of the lay-up tool and the near net shape profile of the first forming surface of the forming tool, which is in proportion to a variable thickness distribution of the near net shape of the component (as defined by the forming surface of the forming tool).

Figure 6:
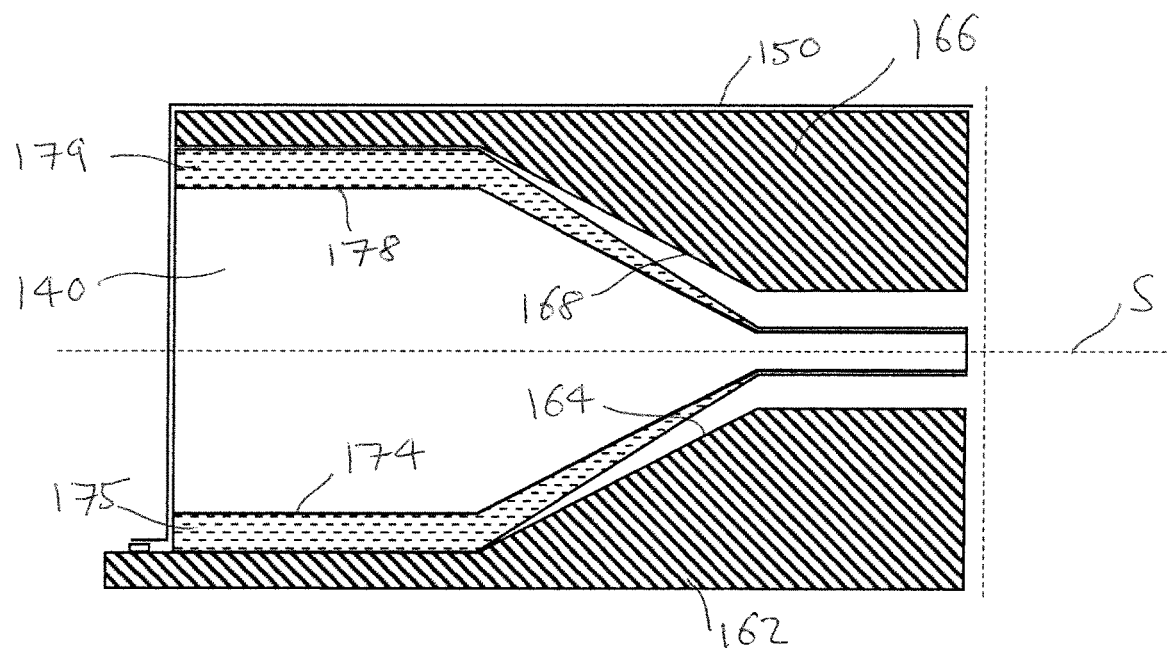
FIGS. 6 and 7 show forming of the preform of FIG. 4 on the forming tool.

As shown in FIG. 6, in this particular example, the preform 140 is transferred to the forming tool 160 so that the lowermost ply of the preform 140 which was supported on the lay-up surface of the lay-up tool 130 is supported on the first forming surface 164 of the first forming element 162 of the forming tool. The second forming element 166 is placed over the preform so that the second forming surface 168 engages the uppermost ply 142 of the preform 140, in the manner of a caul plate. The preform 140 is then cured under elevated pressure and temperature between the first and second forming elements 162, 166 of the forming tool. For example, a vacuum bag 150 may be applied over the forming tool, and a vacuum applied to the forming tool and preform to apply pressure. The forming tool may be heated by one or more heaters, or the forming tool may be placed in an oven or autoclave.

Figure 7:
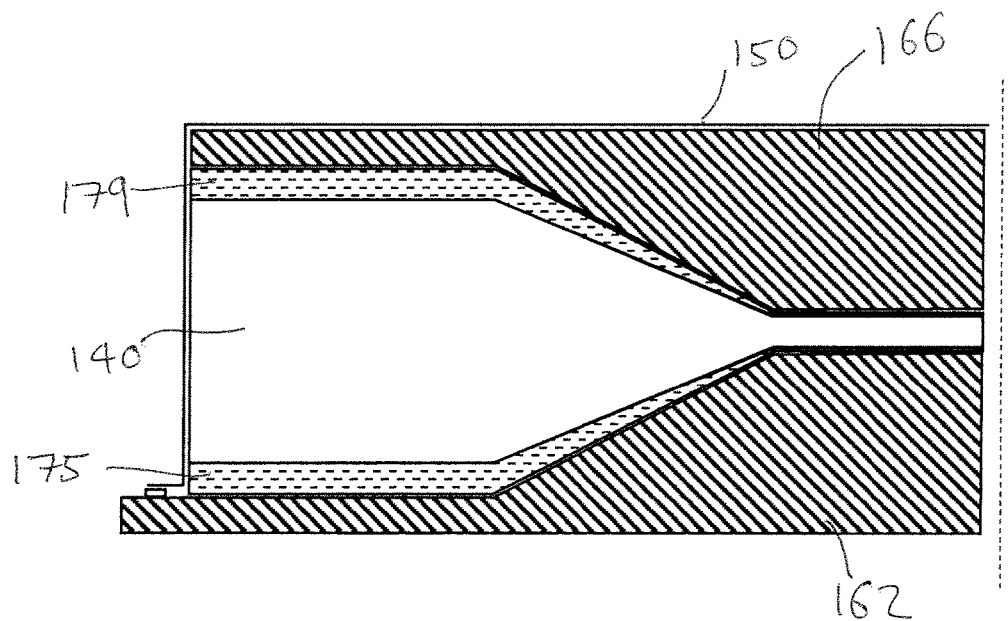

As shown in FIG. 7, as the first and second forming elements 162, 166 are drawn together to consolidate the preform 140 between them, both the lowermost ply and the opposing uppermost ply (i.e. a first surface and opposing second surface) of the preform displace during forming to conform to the respective near net shape profiles of the forming surfaces 164, 168 of the first and second forming elements 162, 166 of the forming tool 160. Accordingly, the near net shape profile and the thickness variation of the blade body is defined by the cooperating configuration of the forming elements 162, 166. As shown in FIG. 7, the outer regions 175, 179 of the preform 140 which correspond to preform bulk prior to forming are displaced so as to conform to the near net shape profiles of the first and second forming surfaces 164, 168.

The amount by which the lowermost and uppermost ply is displaced during forming may vary over the respective surface, such that during forming, at least in the root, there is a first surface displacement distribution at the lowermost ply and a second surface displacement distribution at the uppermost ply to adopt the near net shape profiles of the respective forming surfaces of the first and second forming elements of the forming tool. In this particular example, the two distributions are equal and opposite one another, since the lay-up profile is offset to accommodate half of the preform bulk, and the forming surfaces are mirror images of one another in the root. Similarly, the profiles of the lowermost and uppermost ply in the root are symmetrical about a plane of symmetry S (as shown in FIG. 4), which in this example is aligned with the radial plane.

Figure 8:
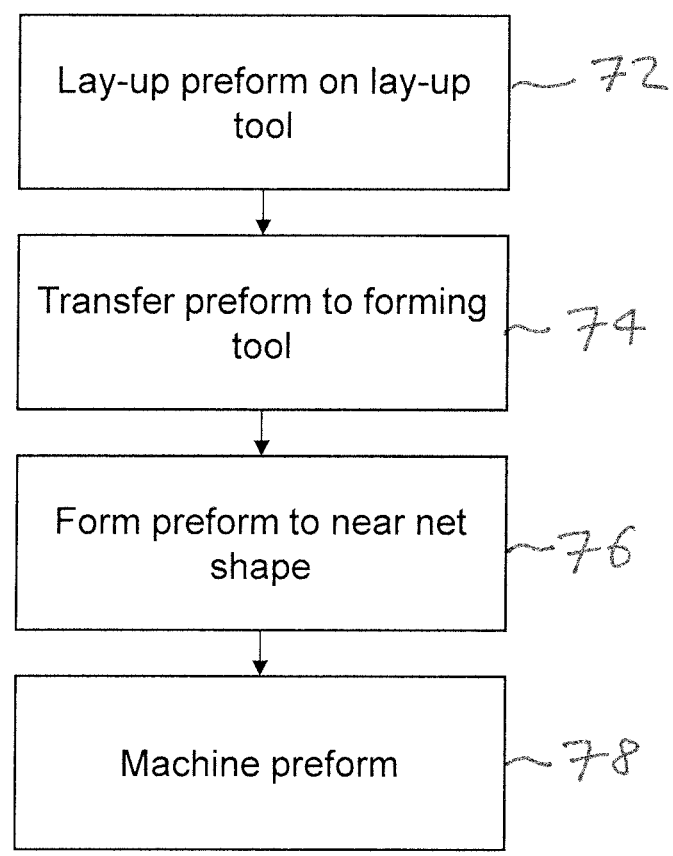
FIG. 8 is a flow diagram of a method of manufacturing a fan blade.

FIG. 8 is a flow diagram of a method of manufacturing a composite component, which illustrates the lay-up and forming steps described above with respect to FIGS. 4-7, and will briefly be described with reference to the tool set (130, 160) and preform 140 of FIGS. 4-7.

In block 72, the preform 140 for the fan blade body is applied on the lay-up surface of the lay-up tool 130, by laying up successive plies of fibre reinforcement material in a layer-wise manner. The preform incorporates a preform bulk equivalent to approximately 10% of the thickness of the near net shape of the fan blade boy.

In block 74, the preform 140 is transferred to the first forming element 162 of the forming tool 160 so that the lowermost ply which was supported on the lay-up surface of the lay-up tool is supported on the first forming surface 164 of the forming tool.

In block 76, the second forming element 166 is applied over the preform 140, and the forming tool 160 is operated to place the preform 140 under elevated temperature and pressure so as to form the preform to the near net shape of the fan blade body as defined by the near net shape profiles of the first and second forming surfaces 164, 168 of the first and second forming elements 162, 166 of the forming tool 160.

In block 78, the formed fan blade body is removed from the forming tool and is machined to net shape (i.e. the final shape of the fan blade body). The fan blade body can be incorporated into a gas turbine, such as the example gas turbine of FIG. 1.

By offsetting the lay-up profile of the lay-up surface of the lay-up tool relative the near net shape profile of a respective side of the component (i.e. the near net shape profile defined by a respective one of the forming surfaces) to accommodate preform bulk (which may be referred to as "lay-up offsetting"), the invention minimises the largest displacement at either side of the preform during forming. This helps to reduce forming defects, such as wrinkling, which may arise owing to high displacements.

It has also been previously proposed to conduct intermediate consolidation during lay-up, for example by applying a vacuum bag over a partially laid preform, and consolidating the preform under elevated pressure and/or temperature. Intermediate consolidation also mitigates against excessive displacement, as a preform bulk is only permitted to accumulate over a limited portion of the preform between intermediate consolidations.

Such techniques (i.e. lay-up offsetting and intermediate consolidation) may be used together or in isolation. Lay-up offsetting may enable an amount (i.e. a frequency) of intermediate consolidation to be reduced without adversely affecting forming results, or it may be used in place of intermediate consolidation.

By accommodating preform bulk on both sides of a preform, the displacement distribution to reach the near net shape during forming may be symmetrical. In contrast, when preform bulk accumulates on one side of a preform only, it may be more less likely that the uppermost ply can conform to the near net shape (especially without forming defects), such that excess material to be machined away after forming may predominantly be located on one side of the component. Accordingly, after machining, one side of the component may have a ply which defines or closely follows the surface of the component, whereas the opposing side may have plies which terminate partway along the surface (i.e. where they have been machined), which may adversely affect structural properties and surface finish. By permitting preform bulk to accumulate equally on both sides of the preform, the largest displacement of any ply may be reduced (as explained above), such that each side of the preform may conform to the near net shape profile of the respective forming surface.

Accordingly, the profile of the component after forming and before machining may more closely correspond to the net shape of the component—for example each side of the component may have a ply which defines or closely follows the surface of the component.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a composite component, comprising:
    laying-up a preform for the composite component on an upper surface of a lay-up tool defining a lay-up profile, so that a first surface of the preform conforms to the lay-up profile of the lay-up tool and the lay-up profile is imparted on the first surface of the preform;
    transferring the preform to a forming tool comprising a first lower forming surface and an opposing second upper forming surface, each having a near net shape profile corresponding to a respective side of the component; and
    forming the preform in the forming tool to a near net shape of the component;
    wherein the preform has a preform bulk in excess of the near net shape of the component prior to forming; and
    wherein the lay-up profile of the upper surface of the lay-up tool is offset relative to the near net shape profile of the first lower forming surface of the forming tool to accommodate a proportion of the preform bulk of the preform, the preform exceeding the near net shape for the component on opposing sides of the preform;
    whereby the forming tool displaces the first surface of the preform laid up on the upper surface of the lay-up tool during forming to conform to the near net shape profile of the first lower forming surface of the forming tool, and the forming tool further displaces a second surface of the preform opposite the first surface during forming to conform to the near net shape profile of the second upper forming surface of the forming tool.

2. A method according to claim 1, wherein the lay-up profile of the upper surface of the lay-up tool is offset relative to the near net shape profile of the first lower forming surface of the forming tool to accommodate approximately half of the preform bulk.

3. A method according to claim 1, wherein the lay-up profile of the upper surface of the lay-up tool is offset from the near net shape profile of the first lower forming surface of the forming tool so that forming the preform in the forming tool causes:
    the first surface of the preform to displace by a first surface displacement distribution to adopt the near net shape profile of the first lower forming surface of the forming tool; and
    the second surface of the preform to displace by a second surface displacement distribution to adopt the near net shape profile of the second upper forming surface of the forming tool.

4. A method according to claim 3, wherein the first and second surface displacement distributions are equal and opposite one another.

5. A method according to claim 1, wherein the near net shape of the component has a variable thickness distribution between the respective sides of the component, and wherein the lay-up profile of the upper surface of the lay-up tool is offset relative to the near net shape profile of the first lower forming surface of forming tool in proportion to the variable thickness.

6. A method according to claim 1, wherein the component is a blade body for an aerofoil structure, and wherein the lay-up profile corresponds to at least a blade root of the blade body.

7. A method according to claim 6, wherein a blade root portion of the preform has a plane of symmetry (S) between the first and second surfaces of the preform, prior to forming in the forming tool.

8. A tool set for forming a composite component, comprising:
    a lay-up tool having an upper surface configured to receive a preform for the component in a lay-up process, the upper surface defining a lay-up profile and configured to impart the lay-up profile on a first surface of the preform; and
    a forming tool configured to form the preform to a near net shape of the component, the forming tool comprising a first lower forming surface and an opposing second upper forming surface, each having a near net shape profile corresponding to a respective side of the component; and
    wherein the lay-up profile of the upper surface of the lay-up tool is offset relative to the near net shape profile of the first lower forming surface of the forming tool to accommodate a proportion of a preform bulk of the preform, the preform exceeding the near net shape of the component on opposing sides of the preform;
    such that in use the forming tool is configured to displace the first surface of the preform laid up on the upper surface of the lay-up tool during forming to conform to the near net shape profile of the first lower forming surface of the forming tool, and the forming tool is further configured to displace a second surface of the preform opposite the first surface during forming to conform to the near net shape profile of the second upper forming surface of the forming tool.

9. A tool set according to claim 8, wherein the lay-up profile of the lay-up tool is offset relative to the near net shape profile of the respective forming surface of the forming tool to accommodate the proportion of the preform bulk corresponding to between 4% and 12% of a local thickness of the near net shape defined by the forming tool.

10. A tool set according to claim 8, wherein the near net shape of the component has a variable thickness distribution, and wherein the lay-up profile of the lay-up tool has a variable offset distribution which is in proportion to the variable thickness distribution of the near net shape of the component.

11. A tool set according to claim 8, wherein the tool set is for manufacturing a fan blade body including a blade root, wherein the lay-up profile of the lay-up tool corresponds to at least the blade root.

12. A tool set according to claim 8, wherein, in use, the forming tool is configured to displace the first surface of the preform and the second surface of the preform toward each other to remove the preform bulk of the preform.

* * * * *